Dec. 17, 1957   C. F. HAMMOND   2,816,455
POWER STEERING MECHANISM FOR MOTOR VEHICLES
Filed March 7, 1955

INVENTOR.
CHARLES F. HAMMOND
BY
Whittemore Hulbert & Belknap
ATTORNEYS

United States Patent Office 2,816,455
Patented Dec. 17, 1957

2,816,455

POWER STEERING MECHANISM FOR MOTOR VEHICLES

Charles F. Hammond, Grosse Pointe, Mich., assignor to Ross Gear and Tool Company, Inc., a corporation of Indiana Application March 7, 1955, Serial No. 492,670

2 Claims. (Cl. 74—492)

Power steering mechanisms for motor vehicles as heretofore developed have been of two types. In one there is practically no resistance to the initial turning of the manually operated steering wheel but resistance is built up during movement which is proportional to the steering load. In the other type there is a certain amount of initial resistance to manual operation before the power motor is thrown into operation. Individual motorists differ in their opinion as to which of these two types is preferable. Many believe that freedom from all initial resistance is very desirable while others are of the opinion that some initial resistance contributes to safety in driving.

It is the object of the present invention to obtain a construction in which the driver by a slight adjustment may select whichever type he may desire. To this end the invention consists in the construction as hereinafter set forth.

Figure 1:
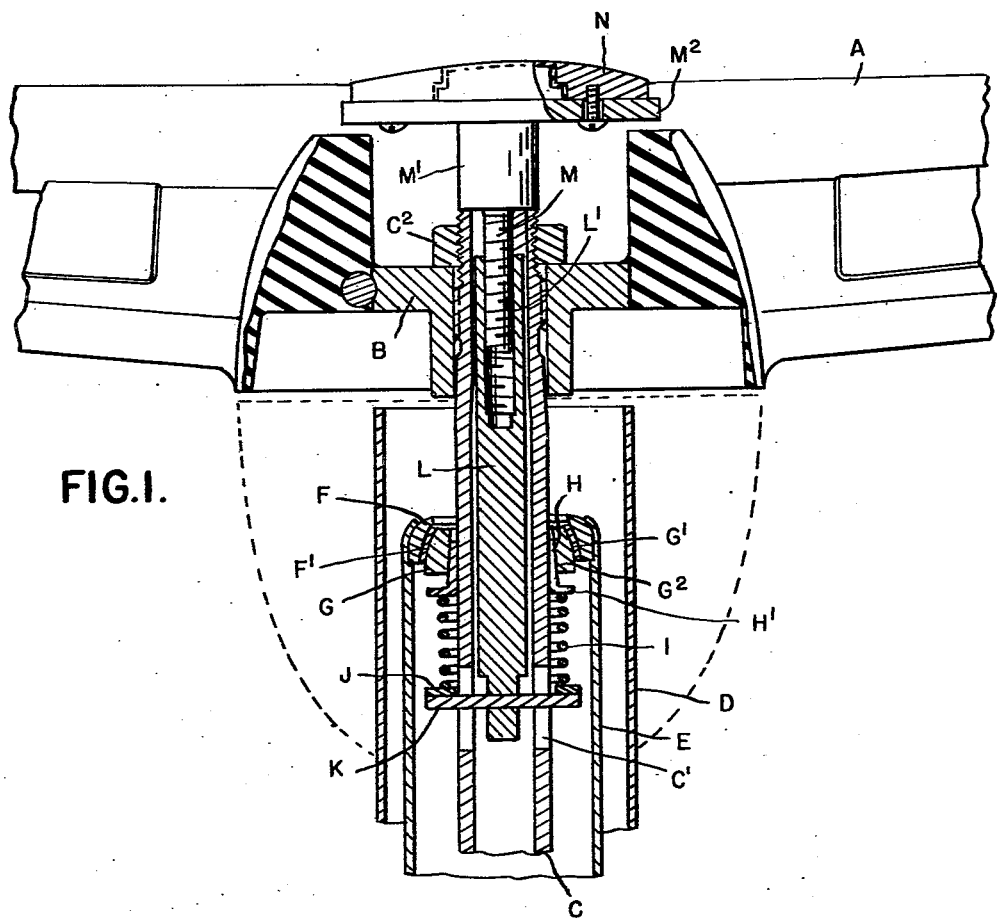
Fig. 1 is a sectional elevation through a portion of the manually operable steering wheel and its connection to the tubular steering shaft showing the resistance adjustment means in connection therewith.
Figure 2:
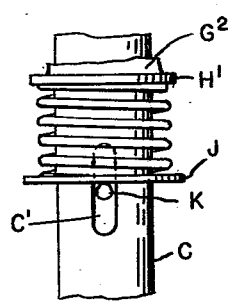
Fig. 2 is an elevation of the steering shaft viewed at right angles to Fig. 1.

As illustrated in Fig. 1, A is the manually operated steering wheel which has a hub portion B connected to a tubular steering stem or shaft C mechanically connected to the steering mechanism and also controlling the power motor for actuating the same. D is the hollow steering column surrounding the stem C. The construction of this steering mechanism is not a part of the instant invention and, therefore, is not illustrated. It will be sufficient to state that it is of the type in which there is substantially no resistance to the initial manual operation of the steering wheel but in which resistance is built up during the movement of the wheel which is proportional to and a fraction of the steering load. Such a construction forms the subject matter of the patent to Hammond, No. 2,650,669, September 1, 1953. To provide means for converting such a construction into one in which there is a predetermined resistance to the initial manual operation of the wheel A, I have provided the following construction:

E is a non-revoluble tubular jacket surrounding the steering stem C. F is an annular member secured to the upper end of the jacket E, and F' is a lining of suitable bearing material which presents an internal segmental spherical surface having its center in the axis of the stem. G is an annular member surrounding the stem C having an external spherical surface G' corresponding to the surface of the member F' and an internal upwardly tapering conical surface $G^2$ spaced from the outer surface of the stem C. H is a longitudinally split annular member sleeved on the stem C and having an external conical surface corresponding to the inner surface $G^2$ of the member G. The lower end of the member H has an outward extending annular flange H' forming an abutment for the upper end of a helical spring I, also sleeved on the stem C. J is an annular member in contact with the lower end of the spring I which is secured to a pin K passing through diametrically opposite slots C' in the tubular stem C. Connected to the pin K within the stem C and extending upward therein is a rod L which at its upper end is provided with an internally threaded socket L'. M is a threaded shank engaging the threaded socket L' and formed integral with a hub M' bearing against the upper end of the tubular stem C. At the upper end of the hub M' is a peripherally knurled dial $M^2$ which may be used as a support for the customary vehicle manufacturers' emblem N placed on most steering wheels. This dial covers a recess in the wheel above the hub portion B thereof which contains a clamping nut $C^2$ for attaching the stem C to the hub B and also contains the hub M'. The construction just described forms a means for placing a variable resistance to the turning of the wheel A due to the frictional engagement of the members F and G. The amount of this resistance can be altered by the turning of the dial $M^2$ which through its threaded shank M raises or lowers the rod L and through the pin K correspondingly raises or lowers the annular member J to increase or diminish the tension of the spring I. As this spring bears against the flange H' of the tapering sleeve H which in turn contacts with the member G, the pressure of the latter against the contacting segmental spherical surface of the member F will be increased or diminished to correspondingly increase or decrease the frictional resistance between said members. Thus, by adjustment of the dial $M^2$ the friction may be reduced to be negligible as a resistance to the turning of the wheel A so that the latter is without initial load. On the other hand the dial may be adjusted to introduce resistance to the manual turning of the wheel A and the amount of this resistance may be varied to suit the individual operator.

What I claim as my invention is:

1. In a vehicle power steering mechanism of the type in which there is substantially no initial resistance to the manual turning of the steering wheel and shaft attached thereto controlling the power but in which resistance is built up by said mechanism during said turning which is a fraction of and proportional to the steering load; supplemental means for imposing a predetermined resistance to said initial manual movement of the wheel including a non-revoluble friction member surrounding said shaft, a cooperating friction member movably mounted on said shaft, and means operable from above said wheel for pressing the latter friction member against the surrounding friction member with variable pressure to obtain the desired resistance.

2. The construction as in claim 1 in which said shaft is tubular and said friction member thereon is axially movable, a helical spring sleeved on said shaft engaging said friction member to press the same against the cooperating surrounding friction member, a member sleeved on said stem forming an abutment for the lower end of said spring, a rod extending axially of and within said tubular shaft connected at its lower end through a slot in said shaft to said abutment, and a rotatively adjustable member on said steering wheel having a threaded engagement with said rod through which said abutment may be adjusted to vary the frictional resistance.

References Cited in the file of this patent

UNITED STATES PATENTS

| | | |
|---|---|---|
| 1,447,042 | Ross | Feb. 27, 1923 |
| 1,467,208 | Sumner | Sept. 4, 1923 |
| 2,012,006 | Hawley | Aug. 20, 1935 |
| 2,331,996 | Maurer | Oct. 19, 1943 |